United States Patent
Song (10) Patent No.: US 11,650,299 B2
(45) Date of Patent: May 16, 2023

(54) CALIBRATION METHOD FOR SOLID-STATE LIDAR SYSTEM

(71) Applicant: Liturex (Guangzhou) Co. Ltd, Guangzhou (CN)

(72) Inventor: Yunpeng Song, San Ramon, CA (US)

(73) Assignee: LITUREX (GUANGZHOU) CO. LTD, Guangzhou (CN)

( * ) Notice: Subject to any disclaimer, the term of this patent is extended or adjusted under 35 U.S.C. 154(b) by 299 days.

(21) Appl. No.: 17/144,117

(22) Filed: Jan. 7, 2021

(65) Prior Publication Data

US 2021/0208260 A1 Jul. 8, 2021

Related U.S. Application Data

(60) Provisional application No. 62/958,248, filed on Jan. 7, 2020.

(51) Int. Cl.
G01S 7/497 (2006.01)
G01S 17/10 (2020.01)
G01S 7/481 (2006.01)

(52) U.S. Cl.
CPC .......... *G01S 7/497* (2013.01); *G01S 7/4817* (2013.01); *G01S 17/10* (2013.01)

(58) Field of Classification Search
CPC ......... G01S 7/497; G01S 7/4817; G01S 17/10
See application file for complete search history.

(56) References Cited

U.S. PATENT DOCUMENTS

| | | | |
|---|---|---|---|
| 10,859,684 B1 * | 12/2020 | Nabatchian | G06T 7/13 |
| 2018/0284279 A1 * | 10/2018 | Campbell | G01S 7/4816 |
| 2019/0011542 A1 * | 1/2019 | Shi | G01S 17/89 |
| 2019/0122386 A1 * | 4/2019 | Wheeler | G01S 17/42 |
| 2022/0365186 A1 * | 11/2022 | Schwiesow | G06T 7/97 |

* cited by examiner

*Primary Examiner* — Hwa Andrew Lee
(74) *Attorney, Agent, or Firm* — Womble Bond Dickinson (US) LLP (57) ABSTRACT

An imaging-assisted angular calibration method comprises receiving an image of a spatial resolution chart on a flat board, the image taken by a camera positioned at a predetermined distance from the spatial resolution chart; determining an angular resolution of the camera based on the image of the spatial resolution chart and the predetermined distance; and receiving an image of laser spots in a raster scan pattern incident on the flat board, the laser spots emitted from a LiDAR device positioned at the predetermined distance from the flat board, the raster scan pattern generated based on a group of preset values in the LiDAR device. A set of stepwise moving angles of the LiDAR device corresponding to the group of preset values are then calculated based on the image of the laser spots and the angular resolution of the camera for use in calibrating the LiDAR device.

20 Claims, 11 Drawing Sheets

CALIBRATION METHOD FOR SOLID-STATE LIDAR SYSTEM

CLAIM OF PRIORITY

This application claims the benefit of priority to U.S. Provisional Application No. 62/958,248, titled "CALIBRATION METHOD FOR SOLID-STATE LIDAR SYSTEM", filed Jan. 7, 2020, which application is herein incorporated by reference in its entirety.

TECHNICAL FIELD

Embodiments of the present invention relate generally to remote sensing, and more particularly relate to angular calibrations of a LiDAR device.

BACKGROUND

A LiDAR device can measure distances to objects in an environment by illuminating the objects with laser pulses and measuring reflected pulses from the objects. LiDAR devices typically utilize high-grade optics and a rotating assembly to create a wide field of view, but such implementation tends to be bulky and costly. Solid-state LiDAR devices tend to be less costly but still may have large dimensions.

A solid state LiDAR device can scan laser beams towards a target objet at different directions. A laser scanner in the LiDAR device is controlled by electric currents. Typically, a current with a particular voltage is expected to move the laser scanner to a particular direction; otherwise, the LiDAR device may get a distorted image of the target object. However, due to individual differences of LiDAR devices and environmental factors, such as a temperature, the same voltage may move different laser scanner of LiDAR devices to different directions if not properly calibrated to account for those differences. Therefore, angular calibration is needed to make sure that a solid state LiDAR device can have accurate and reliable expected scanning angles.

SUMMARY

An imaging-assisted angular calibration method comprises receiving an image of a spatial resolution chart on a flat board, the image taken by a camera positioned at a predetermined distance from the spatial resolution chart; determining an angular resolution of the camera based on the image of the spatial resolution chart and the predetermined distance; and receiving an image of laser spots in a raster scan pattern incident on the flat board, the laser spots emitted from a LiDAR device positioned at the predetermined distance from the flat board, the raster scan pattern generated based on a group of preset values in the LiDAR device. A set of stepwise moving angles of the LiDAR device corresponding to the group of preset values are then calculated based on the image of the laser spots and the angular resolution of the camera for use in calibrating the LiDAR device.

BRIEF DESCRIPTION OF THE DRAWINGS

Embodiments of the disclosure are illustrated by way of example and not limitation in the figures of the accompanying drawings, in which like references indicate similar elements.

DETAILED DESCRIPTION

The following description and drawings are illustrative and are not to be construed as limiting. Numerous specific details are described to provide a thorough understanding of various embodiments. However, in certain instances, well-known or conventional details are not described in order to provide a concise discussion of the embodiments.

LiDAR devices of the same model produced in large quantities typically have the same laser scanner controlled by the same scanning application (e.g., a software controller). A current of a particular voltage is expected to result in a particular scanning angle in all the LiDAR devices of the same model. However, individual differences exist for different LiDAR devices due to production imperfection and environmental factors. Mechanical alignment of the scanning element also introduces deviations that needs to be individually characterized and compensated.

Described herein are systems, methods and media for calibrating a LiDAR device to account for the individual differences and environment factors such that the laser scanner of the LiDAR device may scan at the desired directions.

The various embodiments describe imaging-assisted angular calibration of a solid state LiDAR device. The calibration is fully automated, and may result in a modified look-up table in a calibrated LiDAR device to account for the individual differences and environmental factors.

In one embodiment, a method of calibrating a light detection and ranging (LiDAR) device can be practiced with the following items: a computing device with one or more applications for calibration control and calibration values calculation; a spatial resolution chart with known dimensions; a LiDAR device to be calibrated; a camera for imaging the spatial resolution chart and laser spots emitted from the LiDAR device in a raster scan pattern; and a lamp. The computing device is connected with the camera and the LiDAR device, and can instruct the camera to take image, and instruct the LiDAR device to emit laser beams.

The method includes the operation receiving at a computing device, an image of a spatial resolution chart on a flat board, the image taken by a camera positioned at a predetermined distance from the spatial resolution chart; determining, by the computing device, an angular resolution of the camera based on the image of the spatial resolution chart and the predetermined distance; and receiving, by the computing device, an image of laser spots in a raster scan pattern incident on the flat board, the laser spots emitted from the LiDAR device positioned at the predetermined distance from the flat board, the raster scan pattern generated based on a group of preset values in the LiDAR device. The method further includes the operations of calculating, by the computer device, a set of stepwise moving angles of the LiDAR device corresponding to the group of preset values based on the image of the laser spots and the angular resolution of the camera; and calibrating, by the computing device, the LiDAR device using the calculated set of stepwise moving angles and the group of preset values.

In one embodiment, the angular resolution of the camera is one of a vertical pixel angular resolution of the camera or a horizontal pixel angular resolution of the camera, wherein the raster scan pattern is one of a vertical horizontal scan or a horizontal raster scan, and wherein the set of stepwise moving angles of the LiDAR device is a set of stepwise moving angles vertically or horizontally. The set of stepwise moving angles of the LiDAR device are the stepwise moving angles of one or more Microelectromechanical Systems (MEMS) mirrors.

In one embodiment, the image of the spatial resolution chart is taken when the spatial resolution chart is illuminated with a lamp. Each of four fiducial markers is positioned at one of the four corners of the spatial resolution chart, and the four fiducial markers determine a region of interest (ROI) on the spatial resolution chart.

In one embodiment, determining, by the computing device, the angular resolution of the camera based on the image of the spatial resolution chart and the predetermined distance further comprising: determining, by the computing device, a corresponding dimension of the ROI, and determining pixels of the ROI in the corresponding dimension; and dividing, by the computing device, the corresponding dimension by a product of the pixels and the predetermined distance to obtain the angular resolution of the camera.

In one embodiment, calculating, by the computer device, the set of stepwise moving angles of the LiDAR device corresponding to the group of preset values further comprising: selecting, by the computing device, a plurality of pixel rows or pixel columns from the image of the laser spots in the raster scan pattern; obtaining a plot of horizontally or vertically accumulated intensity to get a plurality of intensity peaks, each intensity peak representing a pixel index; and multiplying each pixel index and the corresponding angular resolution of the camera to get the set of stepwise moving angles of the LiDAR device.

The embodiments described in this disclosure are described in reference to a solid-state LiDAR. However, the embodiments can be practiced on a mechanical LiDAR device without modification.

The above summary does not include an exhaustive list of all embodiments in this disclosure. All systems and methods can be practiced from all suitable combinations of the various aspects and embodiments described in the disclosure.

Solid State LiDAR Device

Figure 1:
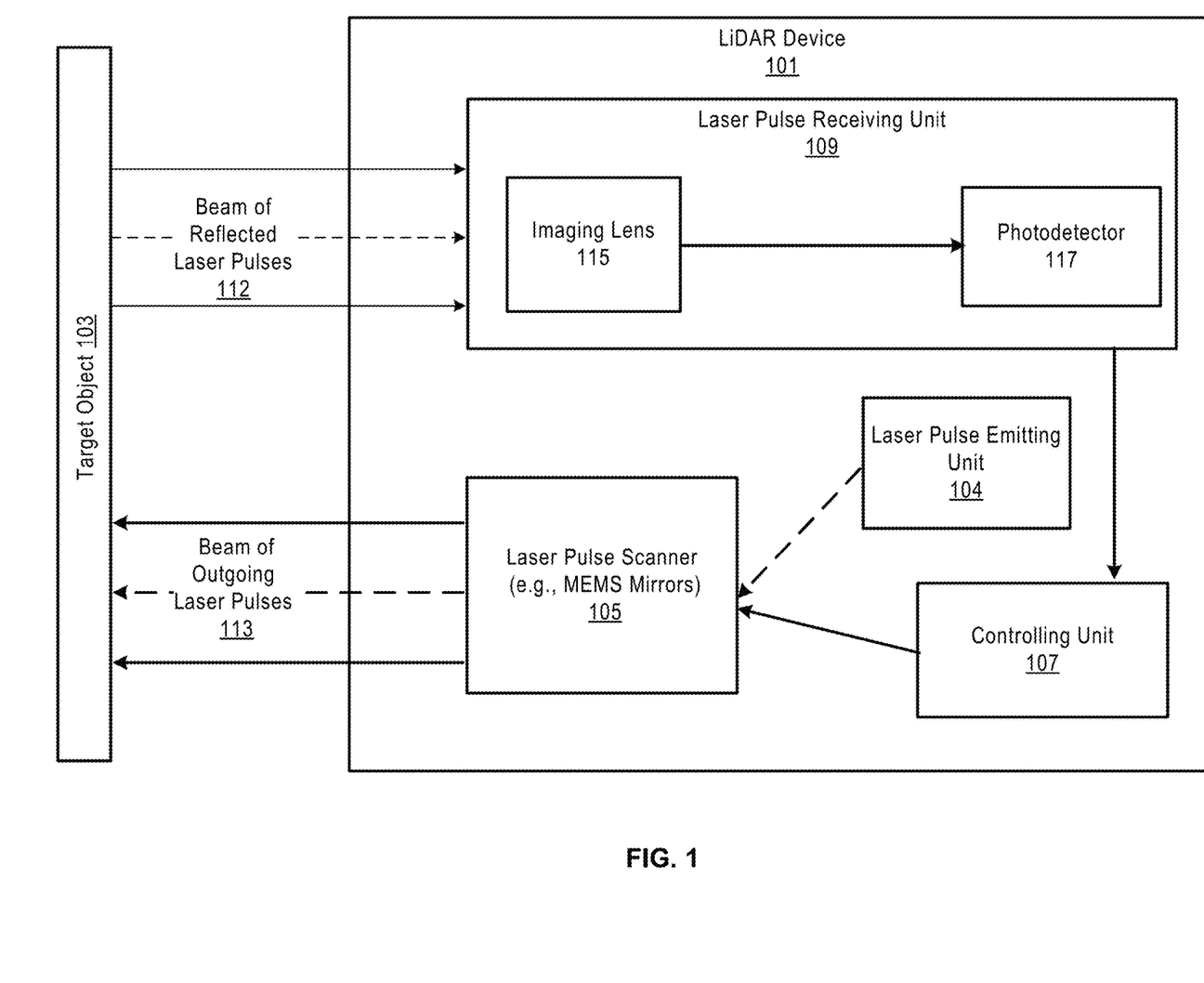
FIG. 1 illustrates an example LiDAR device in which embodiments of the invention can be implemented in accordance with an embodiment.

FIG. 1 illustrates an example of a LiDAR device 101 in which embodiments of the invention can be implemented in accordance with an embodiment.

The LiDAR device 101 can be a solid state LiDAR device 101, which can measure distances to objects in an environment by illuminating the objects with laser pulses (laser beams). Differences in return times of the reflected laser pulses and wavelengths can be used to create a point cloud of the environment. The point cloud can provide spatial location and depth information, for use in identifying and tracking the objects.

As shown in FIG. 1, the LiDAR device 101 can include a laser pulse emitting unit 104, a laser pulse scanner 105, a laser pulse receiving unit 109, and a controlling unit 107. The laser pulse emitting unit 104 can include one or more laser emitters that emit beams of short pulses of laser light including photons of various frequencies. The laser pulse emitting unit can emit laser spots or linear laser beams. In some embodiment, a diffuser can be used to increase the size of laser spots, including changing the shape of the laser spots into laser beams.

In one embodiment, the laser pulse emitting unit 104 can project linear laser beams. In this embodiment, the laser pulse emitting unit 104 uses a number of fast axis collimators (FACs) to collimate laser beams from a laser source array, a cylinder lens array for converting the collimated laser beams to parallel laser beams, and a prism array pair for reducing the pitch of the parallel laser beams. The laser pulse emitting unit 104 can further includes a first cylinder lens for focusing the laser beams from the prism array pair onto a MEMS mirror, which redirects the laser beams as a linear laser beam towards a predetermined direction.

For example, in FIG. 1, the laser pulse emitting unit 104 emits outgoing laser beams 113. The beam of outgoing laser beams 113 can be steered or scanned by the laser pulse scanner 105 in one or more directions using a variety of mechanisms, including microelectromechanical system (MEMS) mirrors, and one or more optical phased arrays (OPA). Each of the one or more directions is referred to as a steering direction or a scanning direction. A vertical angle and a horizontal angle associated with each steering direction is referred to as a steering angle or a scanning angle respectively. The laser pulse scanner 105 can steer one or more beams of laser pulses in a steering direction. Each beam of laser pulses can have a fixed number of pulses.

The controlling unit 107 can include control logic implemented in hardware, software, firmware, or a combination thereof. The controlling logic 107 can drive the other units or subsystems 104, 105 and 109 of the LiDAR device 101 in a coordinated manner, and can execute one or more data processing algorithms to perform one or more operations for signal filtering, object detection, and image processing. For example, the controlling unit 107 can synchronize the laser pulse emitting unit 104 and the laser pulse scanner 105 so that the laser pulse scanner 105 can scan a horizontal field of view in multiple lines or at a particular direction.

The laser light receiving unit 109 can collect one or more beams of laser beams (e.g., laser beams 112) reflected from a target object 103 using one or more imaging lens (e.g., imaging lens 115), and focus the beams of laser pulses a photodetector 117, which can include multiple high-sensitivity photodiodes. The photodetectors can convert photons in the reflected laser pulses into electricity, and send returned signals incident on the photodetector 117 to the controlling unit 107 for processing.

In one embodiment, laser diodes in the laser pulse emitting unit 104 can operate in a pulsed mode with a pulse repeating at a fixed interval (e.g., every few micro-seconds). The laser diodes and laser drive circuits for providing appropriate bias and modulation currents for the laser diodes can be chosen according to predetermined performance parameters of the LiDAR device 101. Examples of the performance parameters can include a required maximum range of scanned space and resolution.

Figure 2A:
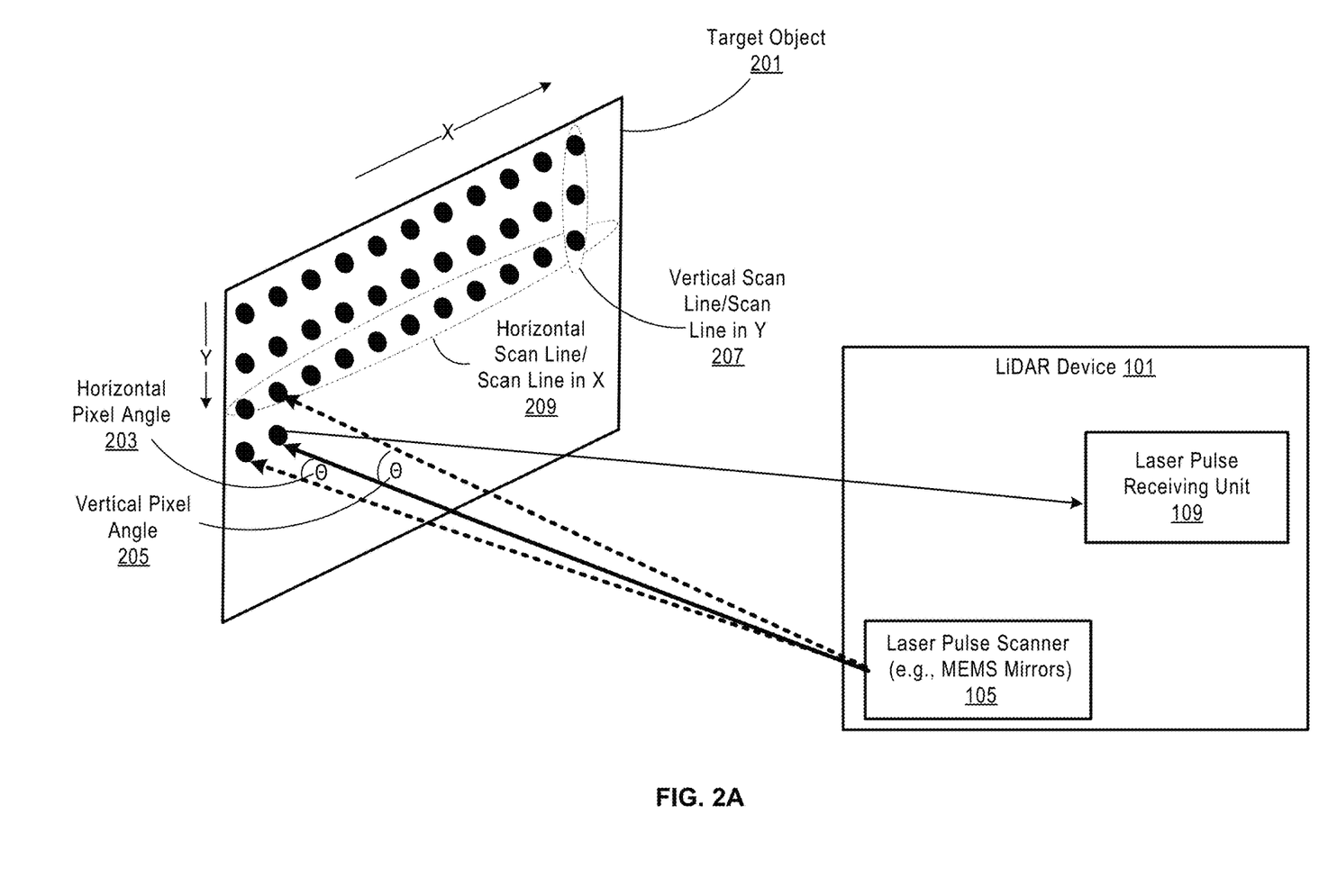
FIGS. 2A-2B illustrate scanning patterns of the laser pulse scanner in accordance with an embodiment.
Figure 2B:
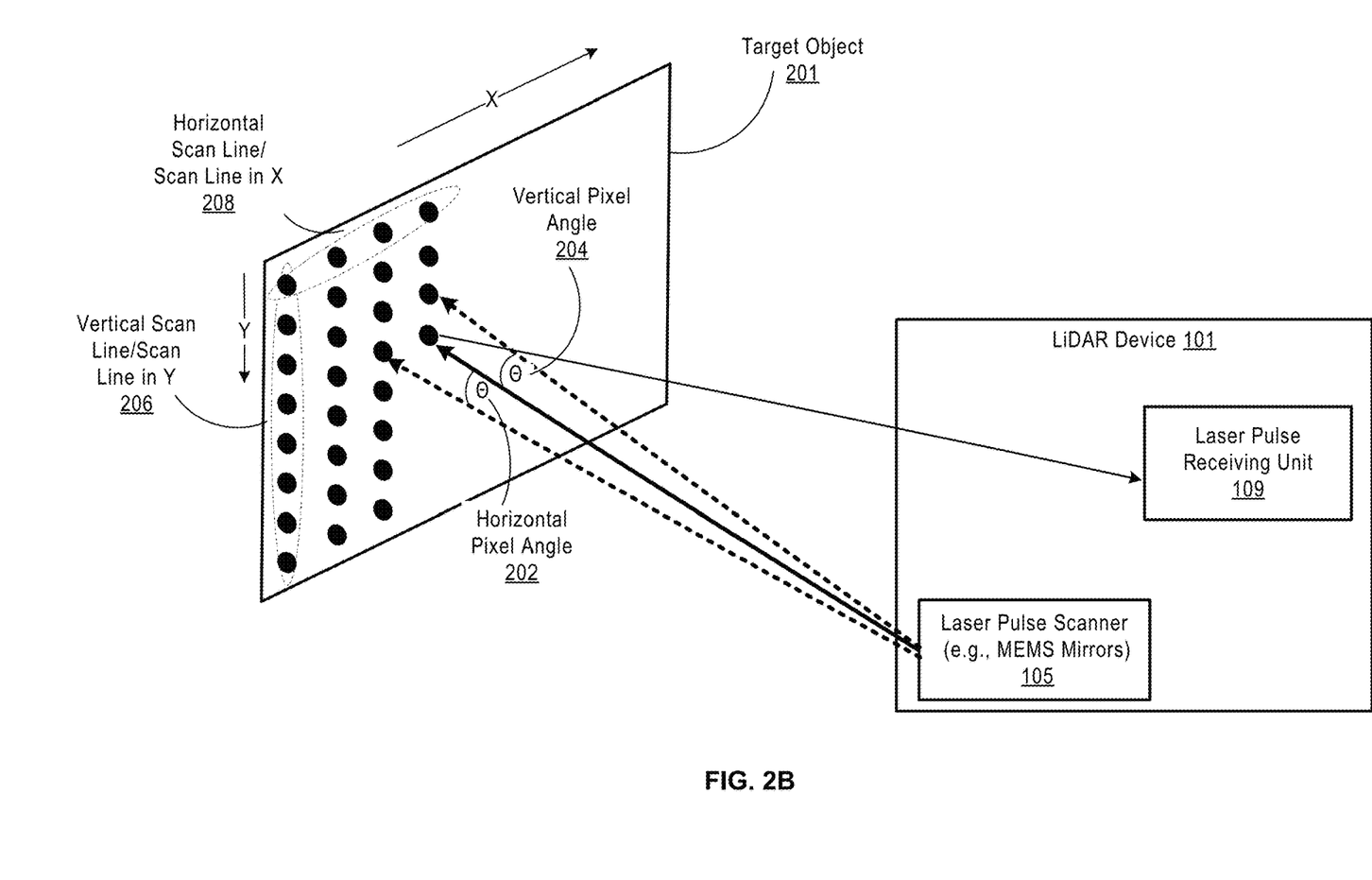

FIGS. 2A-2B illustrate scanning patterns of the laser pulse scanner in accordance with an embodiment. FIG. 2A shows a raster scan pattern along the X axis. In such a scan pattern, a target object 201 is scanned in a rectangular pattern from left to right starting from the top of the target object 201. FIG. 2B shows another raster scan pattern along the Y axis. In such a scan pattern, a target object 201 is scanned in a rectangular pattern from top to bottom starting from the left.

In FIG. 2A and FIG. 2B, the raster scan patterns can form horizontal scan lines 209 and 208, and vertical scan lines 207 and 206. An angle between two neighboring laser spots along a horizontal scan line is referred to as a horizontal pixel angel, and an angle between two neighboring laser spots along a vertical scan line is referred to as a vertical pixel angle. FIG. 2A and FIG. 2B show horizontal pixel angles 203 and 202, and vertical pixel angles 205 and 204.

The vertical pixel angle is controlled by the stepwise rotation of the laser pulse scanner 105 in a vertical direction, and the horizontal pixel angle is controlled by the stepwise rotation of the laser pulse scanner 105 in a horizontal direction. The step wise rotations of the laser pulse scanner 105 need to be calibrated such that the target object 201 can be accurately and reliably captured in a desired angular resolution in both X and Y. As used herein, in one embodiment, angular resolution describes the ability of the LiDAR device 101 to measure the angular separation of points in an object, namely the minimum distance between distinguishable objects in an image.

Such calibration is particular important in a multi-sensor platform, where data from different sensors need to be represented in a common reference frame for the purpose of analysis and data fusion. On platforms where a camera provides intensity data in the form of an image and the LiDAR device supplies depth information in the form of a set of 3D points, such calibration would enable re-projection of the 3D points from the LiDAR device coordinate frame to the 2D coordinate frame of the image.

Angular Calibration

Figure 3:
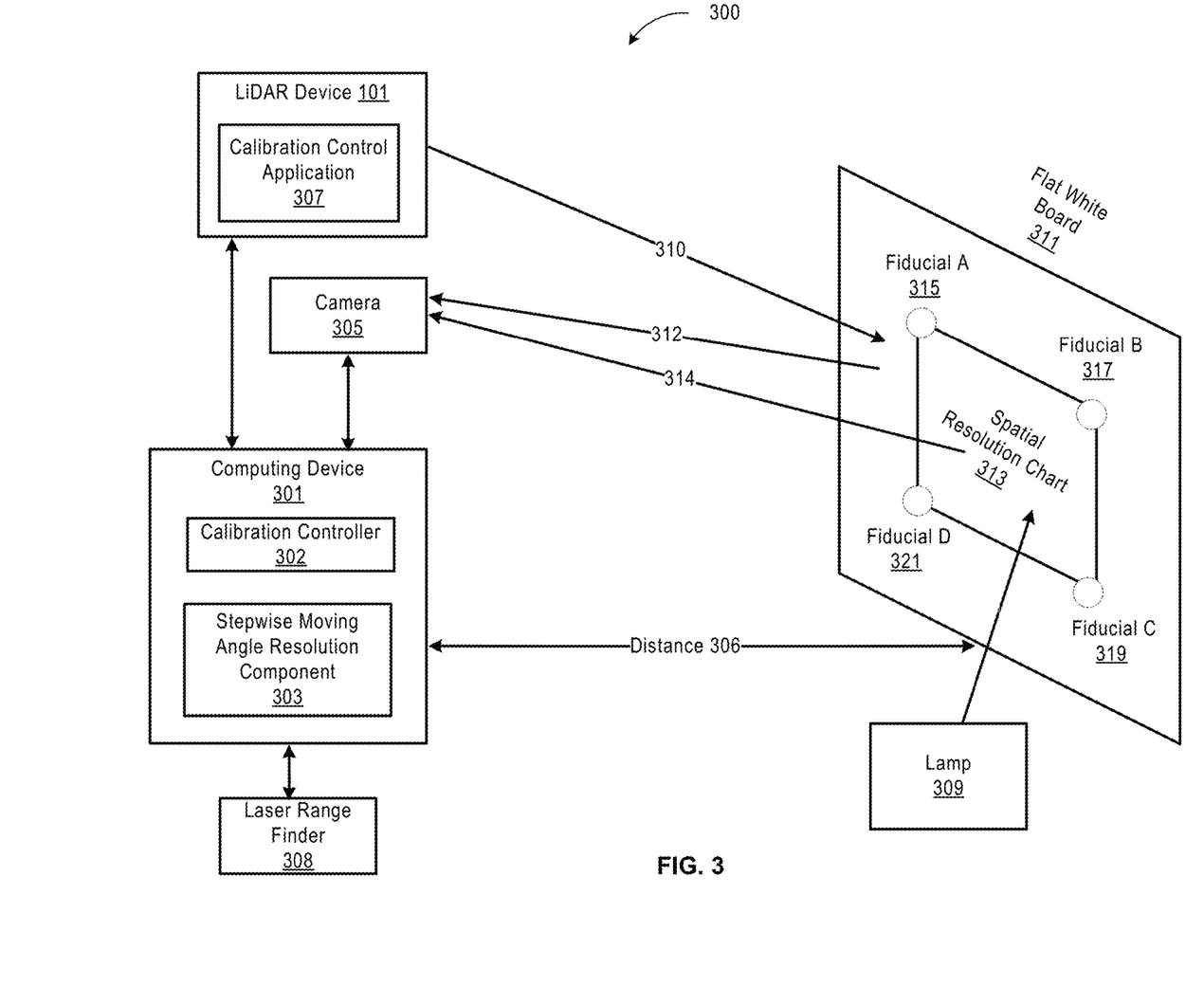
FIG. 3 illustrates a LiDAR calibration system in accordance with an embodiment.

FIG. 3 illustrates a LiDAR calibration system 300 in accordance with an embodiment. The LiDAR calibration system 300 can be used to calibrate MEMS mirror moving angles in horizontal (X) directions and in vertical (Y) directions.

In one embodiment, the LiDAR calibration system 300 can include a LiDAR device 101 to be calibrated, a camera 305, a computing device 301, a lamp 309, a spatial resolution chart 313, and a number of fiducials 315-321.

The LiDAR device 101 is the LiDAR device whose MEMS mirror moving angles need to be calibrated. The camera 305 can be a scientific Complementary metal-oxide-semiconductor (sCMOS) based image sensor. Both the camera 305 and the LiDAR device 101 can be positioned at a predetermined distance 306 from the spatial resolution chart 313 attached to a flat board 311 or a flat white wall. The distance 306 can be measured by a high accuracy distance measurement tool such as a laser ranger finder 308. The fiducials 315-321 can be positioned at the four corners of the spatial resolution chart 313 to mark its boundary. Both the camera 305 and the LiDAR device 101 are connected to the computing device 301 via a universal serial bus (USB) cable or a High Definition Multimedia Interface (HDMI) cable or another type of communication cable, such that the computing device 301 can receive information from and transmit information to the LiDAR device 101 and the camera 305.

The lamp 309 is positioned at a distance that allows the lamp to sufficiently illuminate the flat white board 311 and the spatial resolution chart 313 attached thereon.

In one embodiment, the spatial resolution chart 313 provides a number of small target shapes exhibiting a stepped assortment of precise spatial frequency specimens, and has a series of lines. The smaller the lines the LiDAR device 101 can distinguish, the better the spatial resolution of the LiDAR device 101. The spatial resolution and angular resolution of the LiDAR device 101 or any other image system are closely related and can be converted to each other. An example of the spatial resolution chart 313 is the 1951 USAF (U.S. Air Force) resolution test chart.

In one embodiment, the computing device 301 can be one of a variety of computing devices with a central processing unit (CPU) or a system on a chip. A calibration controller component 302 and a stepwise moving angle resolution component 303 can run on the computing device 301.

In one embodiment, the camera 305 can image 314 the spatial resolution chart 313 illuminated by the lamp 309 to obtain an image of the spatial resolution chart 313 with the four fiducials 315-321 the corners. The camera 305 can also image 312 laser spots emitted 310 by the LiDAR device 101 and incident on the flat white board 311.

The calibration controller 302 can send a command to the camera 305 to trigger the camera 305 to image the spatial resolution chart 313 and the laser spots incident on the flat white board 311, and receive the images taken from the camera 305. The calibration controller 302 can also send a command to the LiDAR device 101 to trigger the LiDAR device 101 to scan the flat white board 311 in a raster scan pattern based on a number control tables with preset values specifying MEMS mirror moving angles of the LiDAR device 101. A calibration control application 307 in the LiDAR device 101 can be used to control the laser pulse scanner 105 to scan the flat white board in the raster scan pattern based on the preset values.

The stepwise moving angle resolution component 303 can determine the stepwise angular resolutions in both the X direction and the Y direction based on the images taken by the camera 305 of the spatial resolution chart 313, the image of the laser spots in the raster scan pattern, and a distance between the LiDAR device 101 and the flat white board 311.

Figure 4:
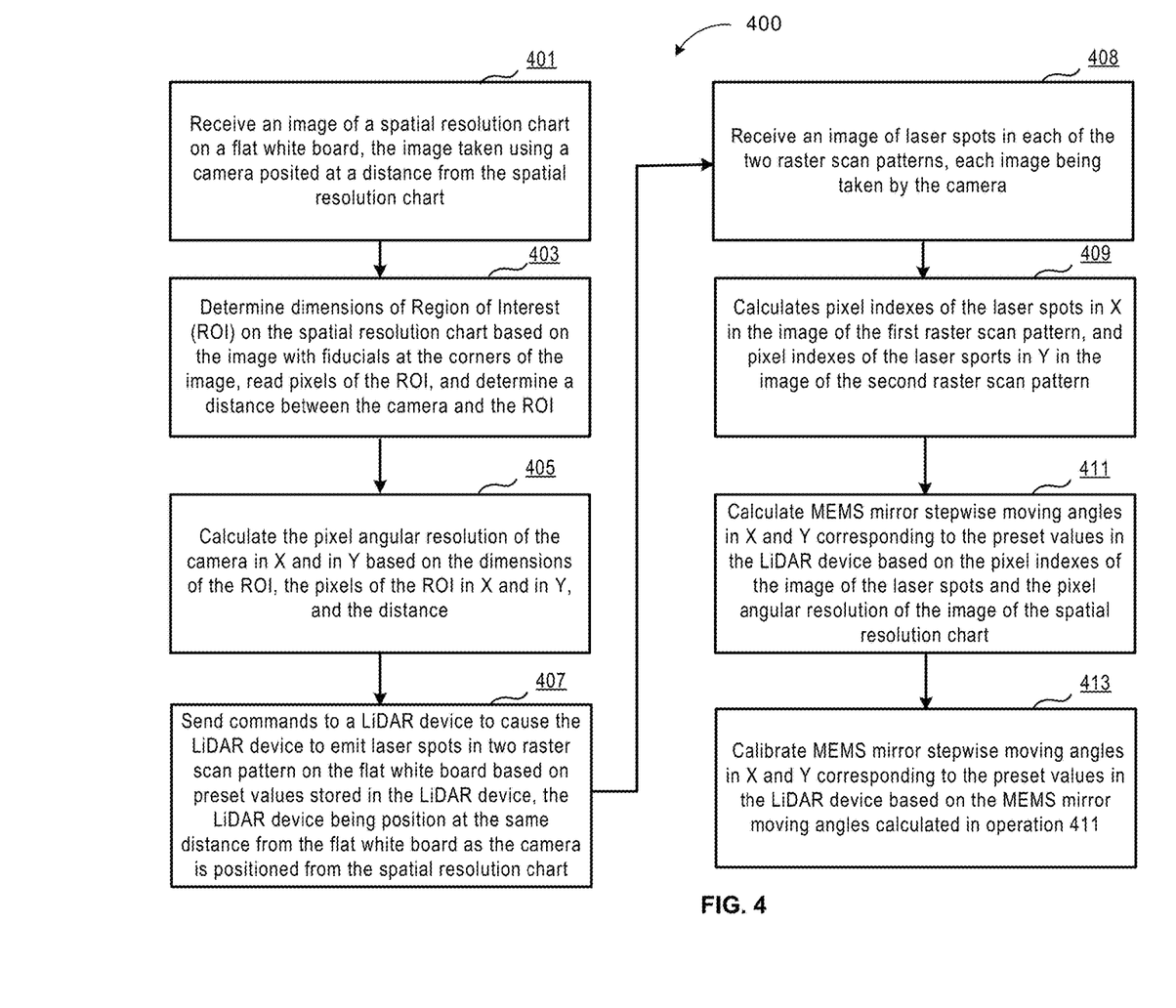
FIG. 4 is a diagram illustrating a process of calibrating the LiDAR device 101 in accordance with an embodiment.

FIG. 4 is a diagram illustrating a process 400 of calibrating the LiDAR device 101 in accordance with an embodiment. Process 400 may be performed by processing logic which may include software, hardware, firmware, or a combination thereof. For example, process 400 may be performed by the calibration controller 302 and the stepwise moving resolution component 303.

Figure 5:
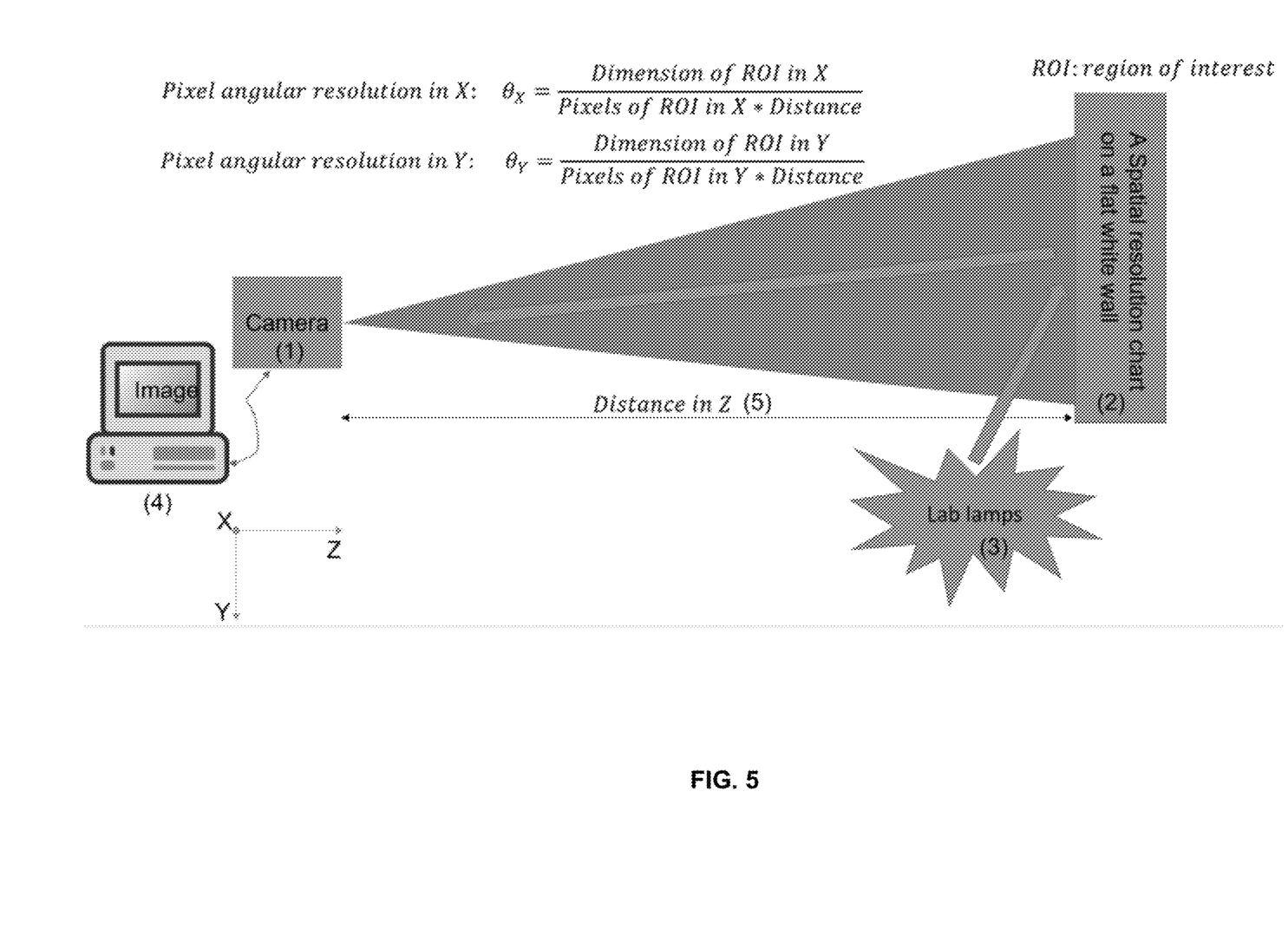
FIG. 5 illustrates a system for calculating angular resolution of a camera in accordance with an embodiment.

As shown in FIG. 4, in operation 401, the processing logic obtains an image of the spatial resolution chart. The image is taken with a camera posited at a distance from the spatial resolution chart on a flat white board. A fiducial is position at each corner of the spatial resolution chart. When the camera takes the image of the spatial resolution chart, a lamp is used to illuminate the spatial resolution chart. The image of the spatial resolution chart with the fiducials at the corners is transmitted to the processing logic in response to a request from the processing logic. The image of the spatial resolution chart can be taken using a setup as shown in FIG. 5.

In operation 403, the processing logic determines dimensions of Region of Interest (ROI) on the spatial resolution chart based on the image of the image, reads pixels of the ROI, and determines a distance between the camera and the ROI. As the dimensions of the spatial resolution chart is known, a region identified by the fiducials at the corners of the spatial resolution chart can be determined. This region is the ROI. The dimensions of the ROI can therefore be determined based on the dimensions of the spatial resolution chart and the positions of the fiducials at the corners. Further, a distance between the camera and the ROI on the spatial resolution chart is determined using a laser range finder, and pixels of the ROI on the image can also be read by the processing logic.

In operation 405, the processing logic calculates the pixel angular resolution in X and in Y of the ROI of the image based on the dimensions of the ROI, the pixels of the ROI in X and in Y, and the distance, using the following formulae:

$$\text{Pixel angular resolution in } X: \theta_X = \frac{\text{Dimension of } ROI \text{ in } X}{\text{Pixels of } ROI \text{ in } X * \text{Distance}}$$

$$\text{Pixel angular resolution in } Y: \theta_Y = \frac{\text{Dimension of } ROI \text{ in } Y}{\text{Pixels of } ROI \text{ in } Y * \text{Distance}}$$

Figure 6:
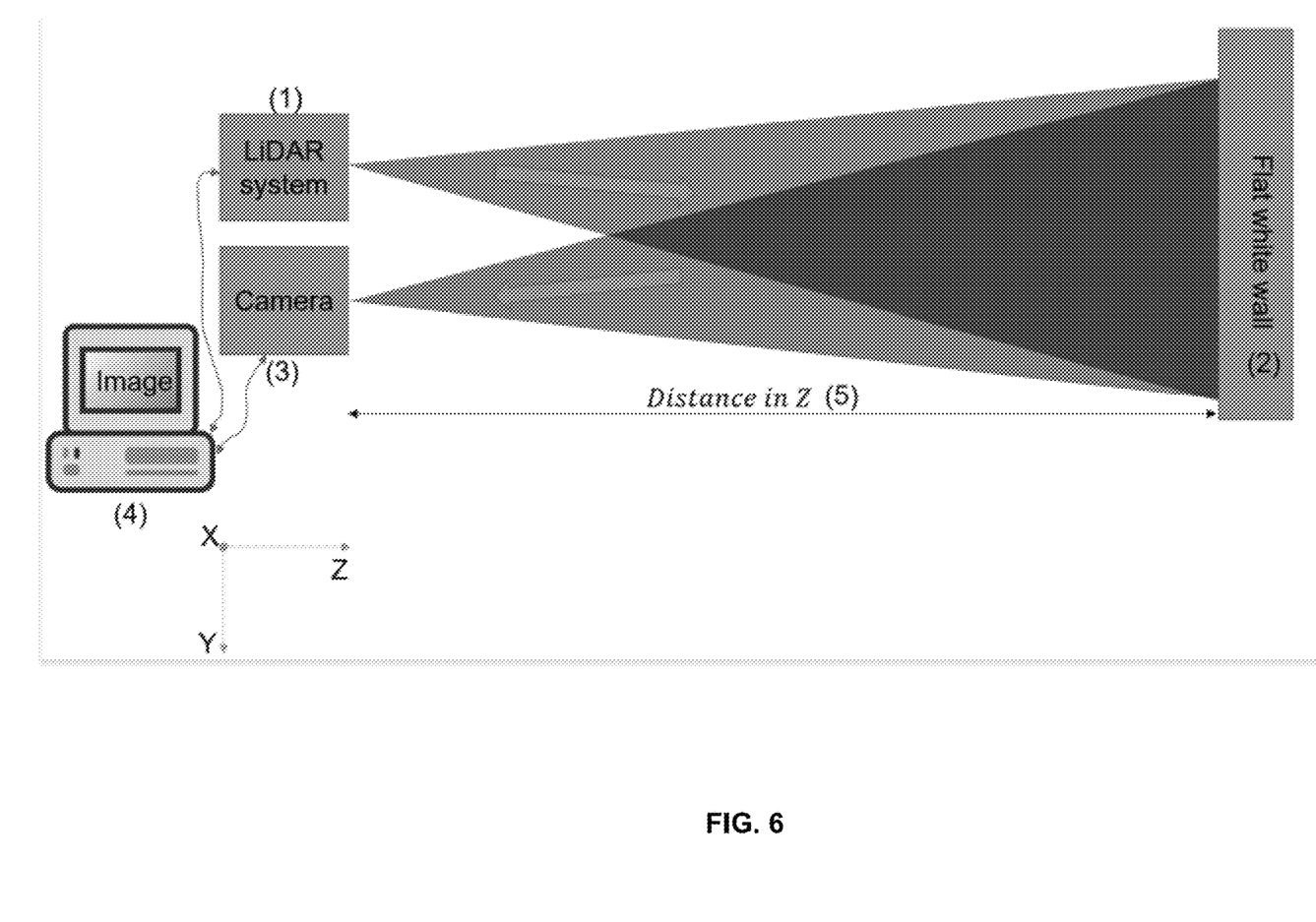
FIG. 6 illustrates a system for calculating stepwise MEMS mirror moving angles of the LIDAR device in accordance with an embodiment.

In operation 407, the processing logic sends commands to a LiDAR device to cause the LiDAR device to emit laser spots in two raster scan patterns on the flat white board based on preset values stored in the LiDAR device, the LiDAR device being positioned at the same distance from the flat white board as the camera is positioned from the spatial resolution chart. The LiDAR device is the device whose MEMS mirror moving angles are to be calibrated. Additional details of this operation is illustrated in FIG. 6.

Figure 7A:
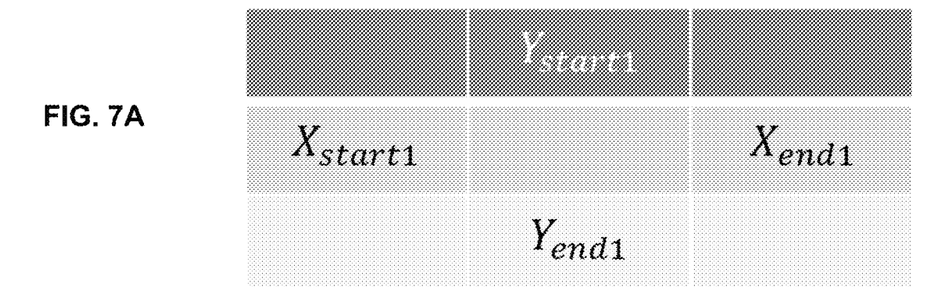
FIGS. 7A-7B illustrate two groups of preset values for use in generating raster scan patterns in accordance with an embodiment.

In this operation, the first raster scan pattern is generated by a first group of preset values stored in a calibration control application in the LiDAR device, as shown in FIG. 7A, wherein the pre-set values of m scan lines in X correspond to an assemble with an interval of $\Delta X = (X_{start1} + X_{end1})/(m-1)$ in a range between $X_{start1}$ and $X_{end1}$, which is translated to the following preset values: $\{X_{start1}, X_{start1} + \Delta X, X_{start1} + 2 \Delta X, \ldots, X_{start1} + (m-1) \Delta X\}$.

Figure 7B:
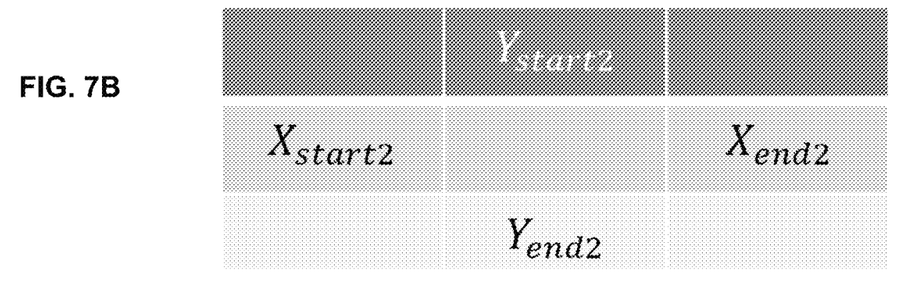

The second raster pattern is generated by a second group of pre-set values stored in the calibration control application of the LiDAR device, as shown in FIG. 7B. The preset values of n scan lines in Y correspond to an assemble with an interval of $\Delta Y = (Y_{start2} + Y_{end2})/(n-1)$ in a range between $Y_{start2}$ and $Y_{end2}$, which is translated to the following preset values: $\{Y_{start1}, Y_{start1} + \Delta Y, Y_{start1} + 2 \Delta Y, \ldots, Y_{start1} + (n-1) \Delta Y\}$.

In operation 408, the processing logic receives an image of the first raster scan pattern, and a second image of the second raster scan pattern. Both images are taken by the camera using a long exposure time. For both images, the illumination source is a laser array (e.g., the laser pulse emitting unit 104) integrated in the LiDAR device, compared to the image of the spatial resolution chart that is taken under the illumination of a lamp.

In operations 407 and 408, the first raster scan pattern can be performed and the image of the scan pattern is taken. Then, the second raster scan can be performed and the image of the scan pattern is taken. Alternatively, the second raster scan pattern can be performed and the image of the scan pattern is taken.

Figure 8A:
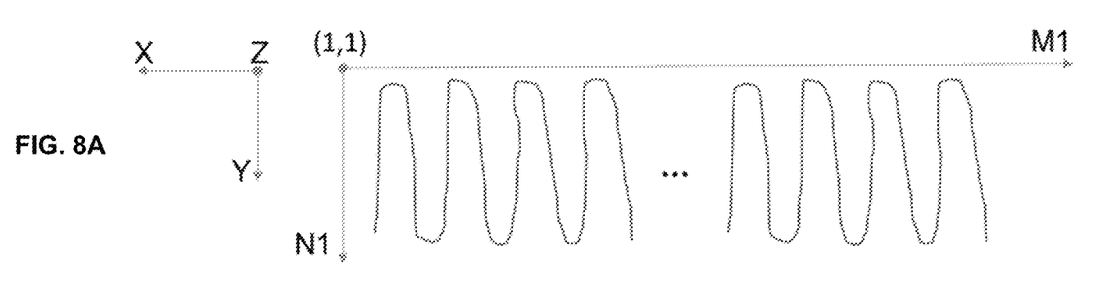
FIGS. 8A-8B illustrate raster scan patterns captured by the camera in accordance with an embodiment.
Figure 8B:
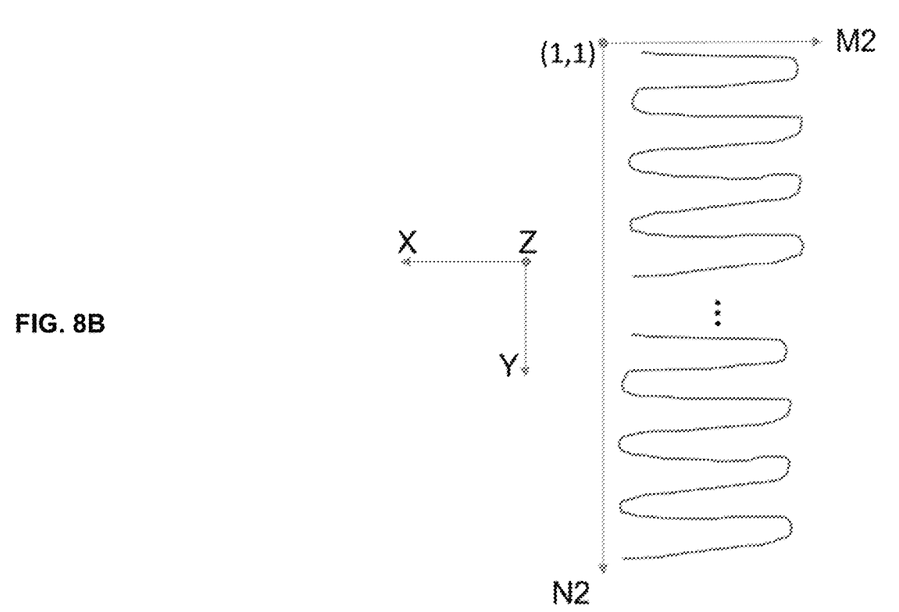

In one embodiment, the image showing the first raster scan pattern can be shown in FIG. 8A, which shows a region of M1*N1 pixels selected from the first captured image covering the pattern. The image showing the second raster scan pattern can be shown in FIG. 8B, which shows a region of M2*N2 pixels selected from the captured image covering the pattern.

Figure 9A:
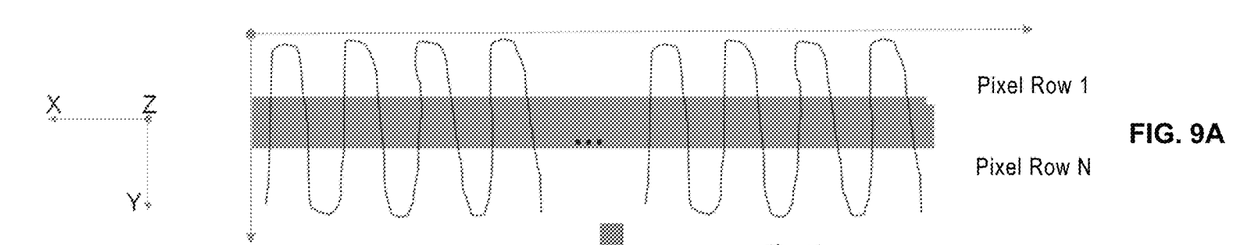
FIGS. 9A-9C illustrate a process of calculating stepwise MEMS mirror moving angles of the LIDAR device in accordance with an embodiment.
Figure 9B:
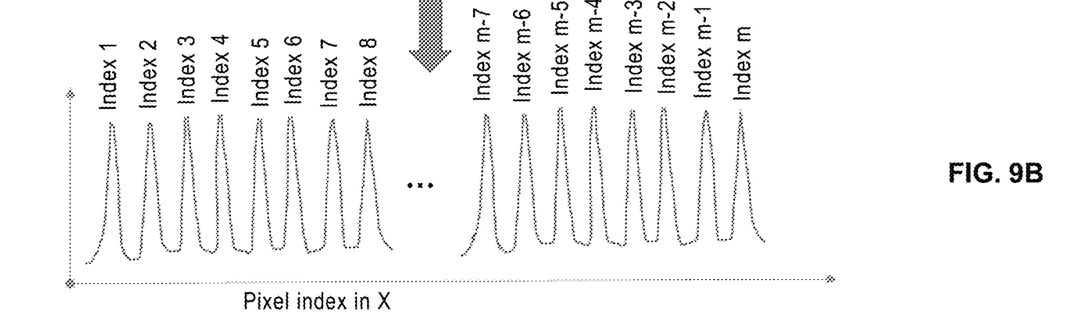

In operation 409, the processing logic calculates pixel indexes of the laser spots in X in the image of the first raster scan pattern, and pixel indexes of the laser sports in Y in the image of the second raster scan pattern. Additional details for calculating the pixel indexes in the image of the first raster scan pattern is shown in FIG. 9A and FIG. 9B. The pixel indexes in the image of the second raster scan pattern can be similarly performed.

As shown in FIG. 9A and FIG. 9B, pixel rows 1 to N are selected to avoid the bending features of the raster scan pattern such that the selected region contains distinguished lines along X. A plot of accumulated intensity versus pixel index in X can be obtained when summing up the intensity along Y for the pixel rows 1 to N of the selected region above. Each intensity peak in the plot corresponds to each scan line of interest, and reports a pixel index (i.e. Index_#).

In operation 411, the processing logic calculates MEMS mirror stepwise moving angles in X and Y corresponding to the preset values in the LiDAR device based on the pixel indexes of the image of the laser spots and the pixel angular resolution of the image of the spatial resolution chart. As the camera pixel angular resolutions in X (i.e. $\theta_X$) has been calculated above in operation 405, the step-by-step/stepwise moving angle of the MEMS mirror for each horizontal scan step (i.e. $\theta_{scan\ step\ \#\ in\ X}$) would be equal to the corresponding pixel index times $\theta_X$ (i.e. $\theta_{scan\ step\ \#\ in\ X}$=Index_# *$\theta_X$). The step-by-step/stepwise moving angle of the MEMS mirror for each vertical scan step can be similarly calculated.

Figure 9C:
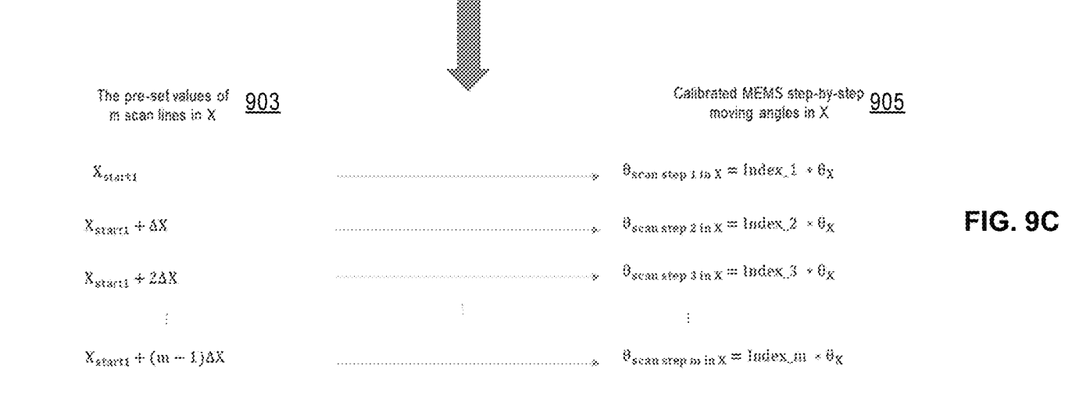

In operation 412, the processing logic calibrates MEMS mirror stepwise moving angles in X and Y corresponding to the preset values in the LiDAR device based on the MEMS mirror moving angles calculated in operation 411. FIG. 9C shows how to calibrate the stepwise moving angles in X. The MEMS mirror stepwise moving angles in Y can be similarly calibrated.

FIG. 9C represents a modified lookup table which maps each of the preset values 903 to one of horizontal moving angle 905. Each preset value corresponds to a particular voltage. Therefore, after calibration, the laser pulse scanner of the LiDAR device can scan at the desire direction based on the modified lookup table illustrated in FIG. 9C. A separate modified lookup table (not shown) may be generated after the LiDAR device is calibrated to control the vertical moving angles of the LiDAR device.

Figure 10:
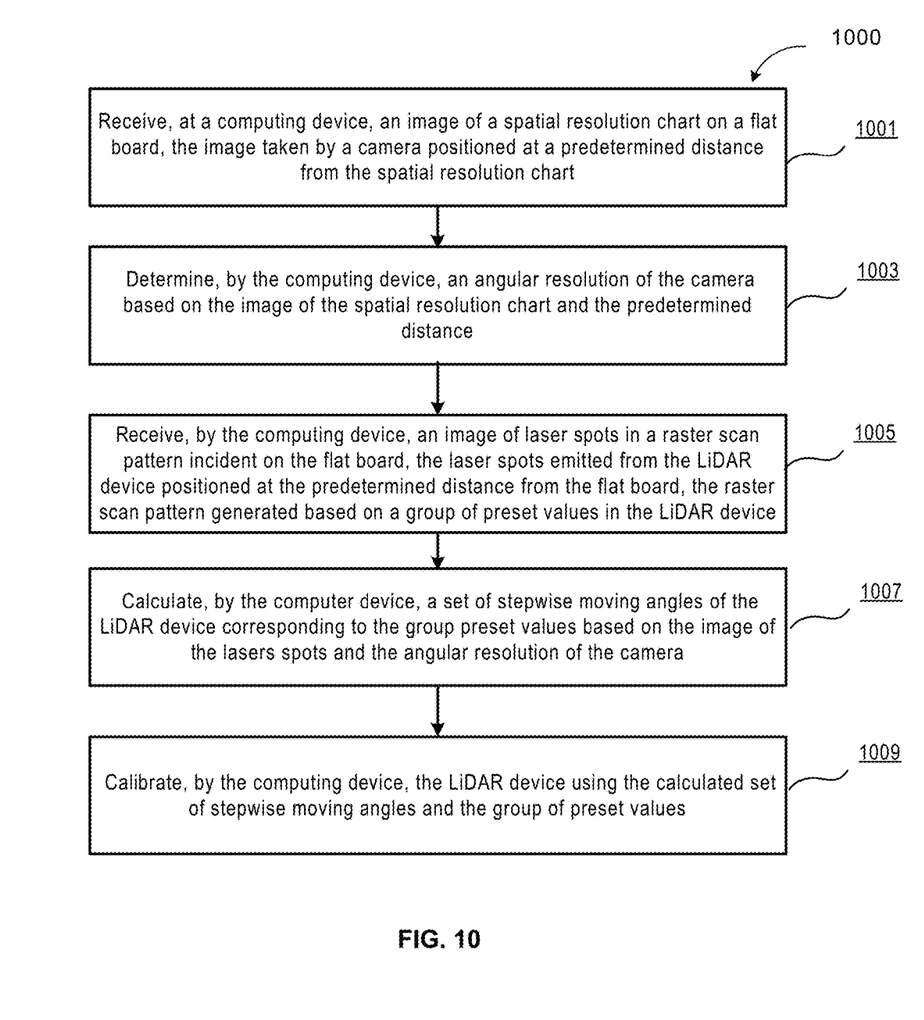
FIG. 10 illustrates a process of calibrating a LiDAR device in accordance with an embodiment.

FIG. 10 is a process 1000 of calibrating a LiDAR device in accordance with an another embodiment. Process 1000 may be performed by processing logic which may include software, hardware, firmware, or a combination thereof. For example, process 1000 may be performed by the calibration controller 302 and the stepwise moving resolution component 303.

As shown in operation 1001, the processing logic receives an image of a spatial resolution chart on a flat board, the image taken by a camera positioned at a predetermined distance from the spatial resolution chart. In operation 1003, the processing logic determines an angular resolution of the camera based on the image of the spatial resolution chart and the predetermined distance. In operating 1005, the processing logic receives an image of laser spots in a raster scan pattern incident on the flat board, the laser spots emitted from the LiDAR device positioned at the predetermined distance from the flat board, the raster scan pattern generated based on a group of preset values in the LiDAR device. In operation 1007, the processing logic calculates a set of stepwise moving angles of the LiDAR device corresponding to the group of preset values based on the image of the laser spots and the angular resolution of the camera. In operation 1009, the processing logic calibrates the LiDAR device using the calculated set of stepwise moving angles and the group of preset values.

Some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

All of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method of calibrating a light detection and ranging (LiDAR) device, comprising:
   receiving, at a computing device, an image of a spatial resolution chart on a flat board, the image taken by a camera positioned at a predetermined distance from the spatial resolution chart;
   determining, by the computing device, an angular resolution of the camera based on the image of the spatial resolution chart and the predetermined distance;
   receiving, by the computing device, an image of laser spots in a raster scan pattern incident on the flat board, the laser spots emitted from the LiDAR device positioned at the predetermined distance from the flat board, the raster scan pattern generated based on a group of preset values in the LiDAR device;
   calculating, by the computing device, a set of stepwise moving angles of the LiDAR device corresponding to the group of preset values based on the image of the laser spots and the angular resolution of the camera; and
   calibrating, by the computing device, the LiDAR device using the calculated set of stepwise moving angles and the group of preset values.

2. The method of claim 1, wherein the angular resolution of the camera is one of a vertical pixel angular resolution of the camera or a horizontal pixel angular resolution of the camera, wherein the raster scan pattern is one of a vertical horizontal scan or a horizontal raster scan, and wherein the set of stepwise moving angles of the LiDAR device is a set of stepwise moving angles vertically or horizontally.

3. The method of claim 2, wherein the set of stepwise moving angles of the LiDAR device are stepwise moving angles of one or more Microelectromechanical Systems (MEMS) mirrors.

4. The method of claim 1, wherein the image of the spatial resolution chart is taken when the spatial resolution chart is illuminated with a lamp.

5. The method of claim 1, wherein each of four fiducial markers is positioned at one of four corners of the spatial resolution chart, and wherein the four fiducial markers determine a region of interest (ROI) on the spatial resolution chart.

6. The method of claim 5, wherein determining, by the computing device, the angular resolution of the camera based on the image of the spatial resolution chart and the predetermined distance further comprising:
   determining, by the computing device, a corresponding dimension of the ROI, and determining pixels of the ROI in the corresponding dimension; and
   dividing, by the computing device, the corresponding dimension by a product of the pixels of the ROI and the predetermined distance to get the angular resolution of the camera.

7. The method of claim 1, wherein calculating, by the computing device, the set of stepwise moving angles of the LiDAR device corresponding to the group of preset values further comprising:
- selecting, by the computing device, a plurality of pixel rows or pixel columns from the image of the laser spots in the raster scan pattern;
- obtaining a plot of horizontally or vertically accumulated intensity to get a plurality of intensity peaks, each intensity peak representing a pixel index; and
- multiplying each pixel index and the corresponding angular resolution of the camera to get the set of stepwise moving angles of the LiDAR device.

8. A light detection and ranging (LiDAR) device calibration system, comprising:
- a processor; and
- a memory coupled to the processor to store instructions, which when executed by the processor, cause the processor to perform operations of calibrating the LiDAR device, the operations comprising:
  - receiving an image of a spatial resolution chart on a flat board, the image taken by a camera positioned at a predetermined distance from the spatial resolution chart,
  - determining an angular resolution of the camera based on the image of the spatial resolution chart and the predetermined distance,
  - receiving an image of laser spots in a raster scan pattern incident on the flat board, the laser spots emitted from the LiDAR device positioned at the predetermined distance from the flat board, the raster scan pattern generated based on a group of preset values in the LiDAR device,
  - calculating a set of stepwise moving angles of the LiDAR device corresponding to the group of preset values based on the image of the laser spots and the angular resolution of the camera, and
  - calibrating the LiDAR device using the calculated set of stepwise moving angles and the group of preset values.

9. The system of claim 8, wherein the angular resolution of the camera is one of a vertical pixel angular resolution of the camera or a horizontal pixel angular resolution of the camera, wherein the raster scan pattern is one of a vertical horizontal scan or a horizontal raster scan, and wherein the set of stepwise moving angles of the LiDAR device is a set of stepwise moving angles vertically or horizontally.

10. The system of claim 9, wherein the set of stepwise moving angles of the LiDAR device are stepwise moving angles of one or more Microelectromechanical Systems (MEMS) mirrors.

11. The system of claim 8, wherein the image of the spatial resolution chart is taken when the spatial resolution chart is illuminated with a lamb.

12. The system of claim 8, wherein each of four fiducial markers is positioned at one of four corners of the spatial resolution chart, and wherein the four fiducial markers determine a region of interest (ROI) on the spatial resolution chart.

13. The system of claim 12, wherein determining the angular resolution of the camera based on the image of the spatial resolution chart and the predetermined distance further comprising:
- determining, by the computing device, a corresponding dimension of the ROI, and determining pixels of the ROI in the corresponding dimension; and
- dividing, by the computing device, the corresponding dimension by a product of the pixels of the ROI and the predetermined distance to get the angular resolution of the camera.

14. The system of claim 8, wherein calculating the set of stepwise moving angles of the LiDAR device corresponding to the group of preset values further comprising:
- selecting, by the computing device, a plurality of pixel rows or pixel columns from the image of the laser spots in the raster scan pattern;
- obtaining a plot of horizontally or vertically accumulated intensity to get a plurality of intensity peaks, each intensity peak representing a pixel index; and
- multiplying each pixel index and the corresponding angular resolution of the camera to get the set of stepwise moving angles of the LiDAR device.

15. A non-transitory machine-readable medium having instructions stored therein, which when executed by a processor of a light detection and ranging (LiDAR) device, cause the LiDAR device to perform operations of calibrating the LiDAR device, the operations comprising:
- receiving, at a computing device, an image of a spatial resolution chart on a flat board, the image taken by a camera positioned at a predetermined distance from the spatial resolution chart;
- determining, by the computing device, an angular resolution of the camera based on the image of the spatial resolution chart and the predetermined distance;
- receiving, by the computing device, an image of laser spots in a raster scan pattern incident on the flat board, the laser spots emitted from the LiDAR device positioned at the predetermined distance from the flat board, the raster scan pattern generated based on a group of preset values in the LiDAR device;
- calculating, by the computing device, a set of stepwise moving angles of the LiDAR device corresponding to the group of preset values based on the image of the laser spots and the angular resolution of the camera; and
- calibrating, by the computing device, the LiDAR device using the calculated set of stepwise moving angles and the group of preset values.

16. The non-transitory machine-readable medium of claim 15, wherein the angular resolution of the camera is one of a vertical pixel angular resolution of the camera or a horizontal pixel angular resolution of the camera, wherein the raster scan pattern is one of a vertical horizontal scan or a horizontal raster scan, and wherein the set of stepwise moving angles of the LiDAR device is a set of stepwise moving angles vertically or horizontally.

17. The non-transitory machine-readable medium of claim 16, wherein the set of stepwise moving angles of the LiDAR device are stepwise moving angles of one or more Microelectromechanical Systems (MEMS) mirrors.

18. The non-transitory machine-readable medium of claim 15, wherein the image of the spatial resolution chart is taken when the spatial resolution chart is illuminated with a lamp.

19. The non-transitory machine-readable medium of claim 15, wherein each of four fiducial market is positioned at one of four corners of the spatial resolution chart, and wherein the four fiducial markers determine a region of interest (ROI) on the spatial resolution chart.

20. The non-transitory machine-readable medium of claim 19, wherein determining, by the computing device, the angular resolution of the camera based on the image of the spatial resolution chart and the predetermined distance further comprising:
- determining, by the computing device, a corresponding dimension of the ROI, and determining pixels of the ROI in the corresponding dimension; and
- dividing, by the computing device, the corresponding dimension by a product of the pixels of the ROI and the predetermined distance to get the angular resolution of the camera.

* * * * *